Oct. 30, 1923.
E. C. WESTERFIELD
1,472,404
WHEEL CONSTRUCTION
Filed Nov. 15, 1919
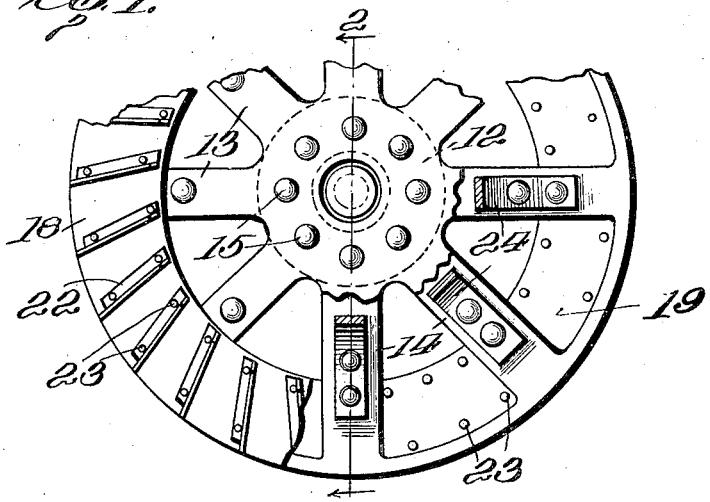
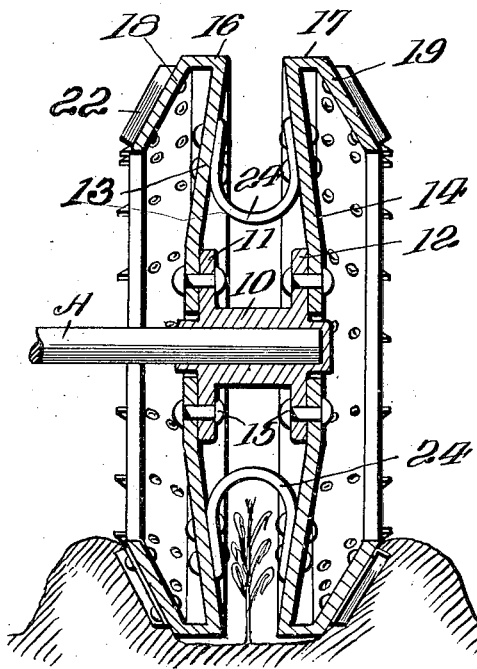
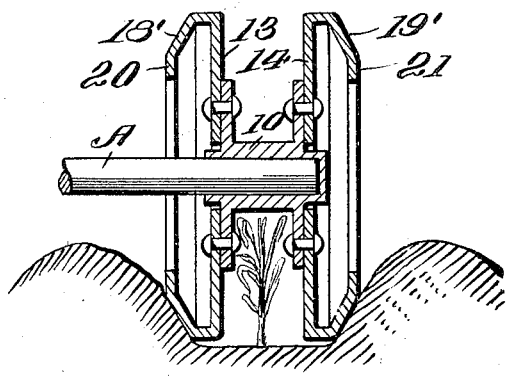
Inventor
E. C. WESTERFIELD.
By Haynes H. Gordon
Attorney Patented Oct. 30, 1923.

1,472,404

UNITED STATES PATENT OFFICE.

EVERETT C. WESTERFIELD, OF TYRONE, OKLAHOMA.

WHEEL CONSTRUCTION.

Application filed November 15, 1919. Serial No. 338,295.

*To all whom it may concern:*

Be it known that I, EVERETT C. WESTERFIELD, a citizen of the United States, residing at Tyrone, in the county of Texas and State of Oklahoma, have invented certain new and useful Improvements in Wheel Constructions, of which the following is a full and complete specification, reference being had therein to the accompanying drawing.

This invention relates to a wheel construction adapted to be used on plowed or listed ground in connection with devices and vehicles used in the cultivation of the ground.

The present invention has more specific relation to a wheel construction adapted to be used on plowed or listed ground in connection with a tractor or othere similar device in which tractive effort is transmitted through the wheel structure to the ground.

It is an object of this invention to provide a duplex wheel construction which will permit the wheel to straddle the "row crop," thereby permitting thorough cultivation of the same.

It is a further object of the invention to provide a wheel construction in which the rim members are so designed that they will remain open and ride the inclined sides of the ridges on either side of the row crop without the constant attention of an operator and without packing of the ground about the roots of the plant.

A still further object of the invention, when utilized for tractive purposes, is the provision of traction surfaces so disposed with relation to the periphery of the wheel as to insure positive gripping of the tractor wheel in the inclined surfaces of the ridges on listed ground, at the same time making unnecessary the changing of the traction surfaces in any way or the employment of fill blocks when the tractor is driven over lawns, roadways, etc.

It is a still further object of this invention to produce such a wheel that will be simple and inexpensive in construction and positive and reliable in its operation.

Other advantages resulting from this wheel construction will be evident to those skilled in the art on a consideration of the following specification and by reference to the accompanying drawing.

To better illustrate the present invention, reference is now had to the accompanying drawings in which one form thereof is disclosed.

Figure 1 is a side elevation of this form of my improved traction wheel shown with one portion partly in section;

Fig. 2 is a cross section on line 2—2 of Fig. 1, and

Fig. 3 a vertical sectional view of a slightly modified form of my wheel.

In the drawings A represents an axle of an ordinary power tractor which may be either the driving or the driven axle on which is mounted a hub 10 provided with two spaced annular collars 11 and 12 to which are attached a pair of web members 13 and 14 by bolts or rivets 15. The said web members 13 and 14 are preferably formed with cut out portions to lighten the wheel and effect a saving in material. A pair of rim portions 16 and 17 are formed at the periphery of each of said web members by bending or otherwise treating the web members adjacent their periphery to provide a flat surface at substantially right angles to said web portions and out-flaring ridge engaging and traction surfaces 18 and 19 at an angle substantially 45° thereto. Extensions 20 and 21 of the angular tread portions 18' and 19' may be provided so as to extend parallel to the web portions 13 and 14. These extensions are particularly applicable to the smaller driven fore-wheels such as are illustrated in Fig. 3, where the angular tread portions 18' and 19' are comparatively short thus preventing soil from entering the annular recess formed between the angular tread portions 18' and 19' and the web members 13 and 14.

When the wheel is used for tractive effort, cleats or lugs 22 may be rigidly secured to the angular tread portions 18' and 19' of the rims 16 and 17 by bolts or rivets 23 or formed integral therwith being so disposed with relation thereto as not to extend to the periphery thereof. Brace irons 24 are rigidly secured to the inner surfaces of each of said web members 13 and 14 and serve to maintain the said members in uniform spaced relation.

Heretofore it has been impracticable to employ power tractors in connection with apparatus for the cultivation of listed ground, inasmuch as the tractor wheels not being designed to remain upon the ridges slide from one side of the ridges to the other resulting in the breaking down of the ridges and the consequent damage to the crop. Traction wheels heretofore in use have necessitated the removal of or otherwise changing the traction surfaces or the insertion of fill blocks between each pair of cleats or lugs whenever the tractor is to be driven over lawns, roadways, etc., as, for instance, from one field to another with the constant loss of time and added expense to construction and equipment.

To obviate these drawbacks and permit of the use of power tractors for the cultivation of listed crops, I provide a wheel composed of two web portions, each rotating from a central hub member and spaced apart so as to straddle the "row crop," each of said web portions being provided adjacent their periphery with flaring inclined tread portions adapted to ride the inclined surfaces of two adjacent ridges bounding the row crop, thus supporting the weight of the tractor on the ridges and preventing the soil from being packed about the tender roots of the young plants. The rim portion of said web members also provides a flattened surface at substantially right angles to said web members adjoining the periphery of said web members and said inclined tread portions, thus providing a smooth rim adapted to support and prevent the traction surfaces of the inclined tread portions from engaging with and damaging lawns, roadways, etc., over which the tractor may be driven when transporting cultivating apparatus from one field to another.

It is to be understood that the present invention is susceptible of variation from the specific embodiment thereof herein set forth and that the same may be modified within the scope of the appended claims.

What I claim as new and desire to secure by Letters Patent is:

1. A tractor wheel having a hub, a pair of spaced spoke members mounted thereon, each of said spoke members having a tread member with a portion bent back and inwardly with respect to the axis of the hub to form inclined tread portions extending away from the median plane of the rim.

2. A tractor wheel having a hub, a pair of spaced spoke members mounted thereon, each of said spoke members having a tread member which is bent back and inwardly with respect to the axis of the hub to form inclined tread portions extending away from the median plane of the wheel, and driving lugs carried by said tread portions.

3. A tractor wheel comprising a hub, a spoke portion, a circumferential rim, said rim having a tread portion extending parallel to the axis of said hub to form a flat tread and a second tread portion inwardly inclined at an angle to said spoke portion to form a ridge engaging tread.

4. A tractor wheel comprising a hub, a spoke portion, a circumferential rim, said rim having a tread portion extending parallel to the axis of said hub to form a flat tread, a second tread portion inwardly inclined at an angle to said spoke portion to form a ridge engaging tread and a plurality of driving lugs carried by said second tread portion.

5. In a tractor wheel, a hub, a spoke member mounted on the hub, a flat tread carried by said spoke member, a second spoke member mounted on the hub and carrying a flat tread spaced from said first flat tread, a flange carried on the outer edge of each tread, and inclined outwardly toward the axis of said hub.

6. In a tractor wheel, a hub, a pair of spaced spoke members mounted upon said hub, and a tread portion carried by each of said spoke members extending outwardly from each of said spoke members away from the median plane of said hub and inclined towards the axis of said hub.

7. In a tractor wheel, a hub, a pair of spaced spoke members mounted upon said hub, a tread portion carried by each of said spoke members extending outwardly from each of said spoke members away from the median plane of said hub and inclined towards the axis of said hub and driving lugs carried by said tread portion.

In testimony whereof I have hereunto set my hand.

EVERETT C. WESTERFIELD.